Nov. 9, 1965  E. S. LAMM  3,217,142
DATA COMPILING SYSTEM
Filed Jan. 29, 1962

INVENTOR.
Earl S. Lamm
BY
Benjamin I. Kaufman
ATTORNEY

United States Patent Office 3,217,142
Patented Nov. 9, 1965

3,217,142
DATA COMPILING SYSTEM
Earl S. Lamm, New York, N.Y.
(Stampfenbrunnenstrasse 24, 8048 Zurich, Switzerland)
Filed Jan. 29, 1962, Ser. No. 169,437
7 Claims. (Cl. 235—61.11)

This invention relates to data compiling systems, and particularly to those systems involving the operation of statistical machines for treating data contained on various cards, record sheets, documents, or other data-bearing media, from which information is to be taken by such machines. After information has been placed upon these cards, they are fed or otherwise introduced into the system or statistical machine, and the latter, in turn, will evaluate and give off the desired information or answer.

Heretofore, in data compiling systems, it has been the practice to record informational data upon unit records, such as punched-cards, record sheets, or other forms of data-bearing media, which are then fed into and processed automatically by statistical machines which are designed to evaluate and render an accounting or statistical report. In such systems, however, each card or unitary record must be fed in and separately processed by the machine, in a series of individual accounting or evaluating operations. Hence, such procedures, because of the required individual handling and processing of each card or record, are found to be relatively time-consuming, and invariably require complex equipment for summarization and reporting.

It is, therefore, an object of the present invention to provide an improved data compiling system, which is adapted to render statistical accounting or evaluation from record cards or other recording media, in a relatively fast and efficient manner.

Another object of the invention is to provide an improved data compiling system, which is adapted to render a statistical accounting or evaluation from a series of record cards or other recording media, assembled in the form of a batch, and as a single, simultaneous operation.

A further object of the invention is to provide an improved record card, which, when assembled in a series or batch arrangement, can make possible the rendering of a statistical accounting or evaluation in a single, simultaneous operation.

Other objects and advantages inherent in the invention will become apparent from the following description and accompanying drawing, which discloses, by way of example, the principle of the invention and the best mode of applying that principle.

In accordance with the present invention, there is provided an improved data compiling sytsem employing an improved record card or sheet having inserts of electrically-resistant material, standardized according to the digits they represent and previously embedded in the cards at one or a plurality of locations on the card, the arrangement thereon depending upon the nature of the information to be recorded or evaluated. These locations or areas are so disposed on the card, and are of similar configuration (for example, in the nature of circles, squares, rectangles, or other suitable geometrical configurations) so that when these cards are assembled in the form of a series or batch arrangement, with each card in exact contact with the card adjacent, the respective electrically-resistant inserts in each card will coincide with those of the adjacent card. The passing of an electric current through the series of the inserts, and through an electrical indicator, such as an ohmmeter, will thus permit the registering of the total resistance value of a series of inserts, in a given position on the cards, and thereby show the value of a particular digital field of the desired accounting or evaluation.

The compiling system, employed in conjunction with evaluating the improved record cards, comprises essentially a card holder or stacking receptacle, an electrical circuit, a source of current, an electrical recording means, and a pair of terminals for the circuit, whereby, upon bridging the terminals by the series of the aforementioned electrically-resistant inserts embedded in their respective cards, the current will flow through the circuit and operate the electrical recording means.

Referring to the drawing.

Figure 1:
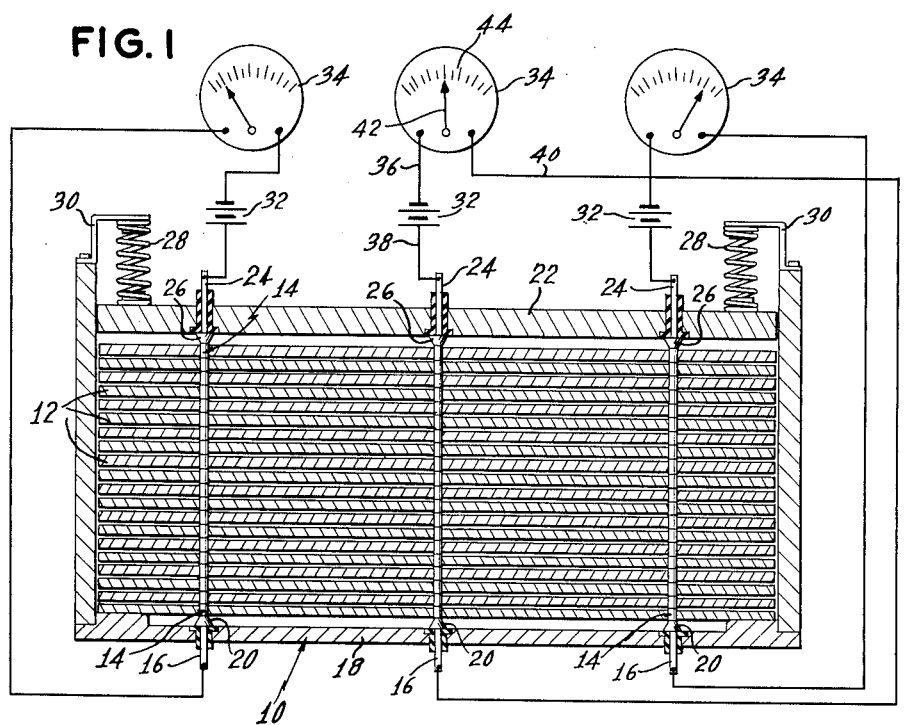
FIG. 1 is a diagrammatic view of an arrangement of the improved data compiling system of the present invention.
Figure 3:
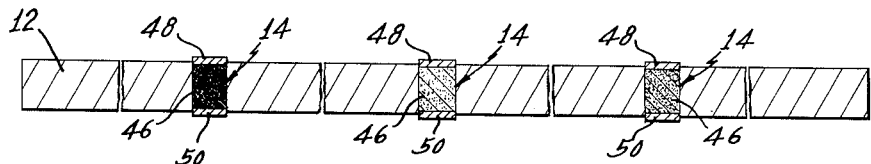
FIG. 3 is a sectional view of the improved record card specifically adapted for use with the data compiling system.

As shown in FIG. 1, there is provided a card holder or stacking receptacle 10 of such contruction and having an internal configuration approximately identical to that of the record cards 12, so that the latter will fit snugly therein, and when assembled in the form of a series or batch arrangement, as in the embodiment shown, each card will be maintained in exact contact and substantially coinciding with the card adjacent. The internal configuration of holder 10 is slightly larger than that of the cards 12, so that while the cards will be maintained in an even stack, insertion and removal from the holder may, nevertheless, be easily effected. As more fully hereinafter described, cards 12, shown in greater detail in FIG. 3, are provided with inserts 14 of electrically-resistant material, standardized according to the values they represent, and which are embedded in the cards at predetermined locations. As shown in FIG. 1, with each card in contact with and substantially coinciding with the card adjacent, the exposed surfaces of the electrically-resistant inserts 14 in each card will also substantially coincide with those of the adjacent cards.

In the embodiment shown in FIG. 1, insulated terminals 16 are mounted in and extend through the bottom wall 18 of holder 10. The free extremities or contact points 20 of terminals 16 are exposed and so arranged in the bottom wall 18, that they can coincide with and press against the respective inserts 14 of the lowermost card of the stack. Holder 10 is also provided with a pressure plate 22, in which are mounted another set of insulated terminals 24, extending through to the lower surface of plate 22. The free extremities or contact points 26 of terminals 24, are also exposed and arranged on the lower surface of plate 22, so that they, also, can coincide with and press against the respective inserts 14 of the uppermost card of the stack. In this manner terminals 16 and 24 can be electrically bridged by their respective series of inserts 14. Pressure plate 22 is of such construction and configuration and slightly smaller than that of the internal configuration of holder 10, that while plate 22 will be maintained snugly within the holder, it will, nevertheless, be free to move vertically therein and still permit the free extremities 26 of terminals 24 to press, at all times, against the respective inserts 14 of the uppermost card of the stack. While plate 22 may be of such thickness and weight as to enable the free extremities or contact points 20 and 26 of terminals 16 and 24, respectively, to exert sufficient pressure against their respective inserts in the card stack for electrical bridging to take place, there is also provided, in the embodiment shown in FIG. 1, pressing means, as shown by springs 28, for the purpose of exerting additional pressure upon the series of inserts. Springs 28 are attached at one end to the extending arms of supporting members 30, which are attached to and positioned near the end of plate 22. The other ends of springs 28 are attached directly to plate 22.

Figure 2:
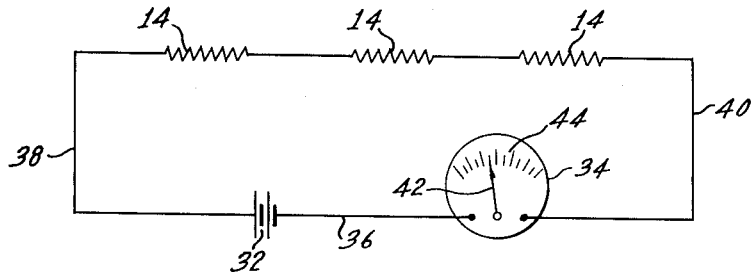
FIG. 2 is a schematic view of a circuit-arrangement to show the manner in which the improved card is utilized in the system.

As shown in FIGS. 1 and 2, the electrical circuit of the compiling system includes a source of current for each series of stacked inserts embedded in the cards, as indicated by batteries 32, electrical recording or indicating means, such as ohmmeters 34, and connecting lines 36 between a terminal of ohmmeter 34 and a terminal of battery 32, connecting lines 38 between the other terminal of battery 32 and insulated terminal 24, and connecting lines 40 between the other corresponding terminal 16 of the circuit and the other terminal of ohmmeter 34. Connecting lines 36, 38 and 40 may be either of the rigid or flexible type, as required. In this manner, when the terminals 16 and 24 are bridged or electrically connected by the respective inserts 14 of a given card stack or series, the ohmmeter 34 will show or record the specific total resistance value of the stack, by the hand or pointer 42 being deflected and coinciding with a specific marking on scale 44.

As previously indicated, cards 12, as shown in detail in FIG. 3, are provided with inserts 14 of electrically-resistant material, standardized according to the values they represent. This electrically-resistant material 46, may comprise any composition or material which can offer electrical resistance to a flow of current and whose components, or physical structure, may be varied to result in a permanent fixed-resistance, corresponding numerically to a desired value. Electrically-resistant material 46 may therefore include various forms of carboniferous materials, or chemical compositions, such as those of metaloid compounds, including those containing silicon, boron or various forms of alloys capable of offering varying degrees of resistance to electric currents. As is illustrated in FIG. 3, inserts 14 are provided with horizontal caps or conductors 48 and 50, projecting through each of two surfaces of card 12, between which the electrically-resistant material 46 is positioned to comprise a complete electric circuit. No electrical conductivity exists between conductors 48 and 50, other than that resulting from the bridging effect of material 46. Conductors 48 and 50 are composed of a relatively low electrically-resistant material (i.e., with respect to the relatively high electrically-resistant material 46), such as copper, silver, or other electrically-conductive material. Inserts 14, as previously indicated, are embedded in cards 12 by means of suitable conventional affixing or embedding apparatus, and since the particular apparatus utilized to embed these inserts in the cards does not form a part of the present invention, further description thereof is not believed to be pertinent thereto.

The improved record cards of the data compiling system of the present invention, as previously indicated, are provided with inserts of electrically-resistant material, standardized according to the digital values they represent. Thus, an insert representing the value 9, would have 9 times the resistance of an insert representing the value 1, for a given position of the desired numerical accounting or evaluation. The value zero can be represented by an insert having substantially no resistance, i.e., the material between conductors 48 and 50 would be of a highly conductive material, and comprised of the same material as conductors 48 and 50, themselves, if so desired, so that this insert in the series would not add substantialy to the total resistance of the circuit. For practical purposes, it is preferred that the inserts contain electrically-resistant material of relatively high value. For example, the value 1, on the scale 44 of ohmmeter 34 could represent 100 ohms, and, progressively, the value 9 would represent 900 ohms. In using relatively high-resistance inserts for the values 1 through 9, the slight quantities of additional resistance that might be induced by failure to have substantially perfect contact between the conductor cap on one card and that of the card adjacent, would be of very slight importance with respect to the total numerical value of a series of inserts, recorded on the ohmmeter. It will be obvious, of course, that in making the final computation of the numerical evaluation or accounting, calculations are made directly from the scale readings of the respective ohmmeters, making proper allowance for the digit multiples each ohmmeter represents, and then compiling the total of these values. Furthermore, if so desired, it is within the scope of the present invention to employ a planetary gear or differential carry between each meter, so that the carry from one meter to the next higher recording meter can take place simultaneously as each meter is recording the value of the ohms in its particular circuit. In the embodiment shown in FIG. 1 of the drawing, each card is provided with three inserts, making possible the recording of a three-digit numeral thereon. It will, of course, be obvious that each card in the stack or deck may contain one or more inserts, limited only by the physical dimensions of the card itself, and/or that of the inserts, provided that each card inserted into the machine for a total evaluation of a particular field or series, contains an equivalent number of inserts for that field or series. Correspondingly, the number of ohmmeters employed in the embodiment shown, will, of course, also correspond with the number of inserts for each field present in each card of the series or deck.

As indicated above, in accordance with the present invention, when the terminals 16 and 24 are bridged or electrically connected by the respective inserts 14 of a given card deck or series, the ohmmeter will show the specific total resistance value of the deck in its circuit. Obviously, when every card in the deck represents a credit (i.e., a positive value) or a debit (i.e., a negative value), the ohmmeter will indicate the cumulative total value, whether it be a positive or a negative value, assuming, of course, that proper identification means (e.g., by color or other markings) are known to the operator for distinguishing positive from negative total values. However, it is also within the scope of the invention to obtain a numerical total value of a deck or series of cards, some of which represent credits (positive values) and others which represent debits (negative values), employing the system hereinbefore described. For this purpose, the insert 14, intended to represent the value zero, instead of being constructed of a material having substantially no resistance, could represent the value zero by an insert comprised of a material of substantially high resistance, with values ascending from zero to the value 9, being represented by inserts comprised of materials of proportionately increasing resistance, while values descending from zero to the value of minus 9, would be represented by inserts comprised of materials of proportionately decreasing resistance. Thus, for example, an insert representing the value zero could have a resistance of 1,000 ohms; values from 1 to 9 would be represented by inserts having resistances increasing in 100 ohm progressions per unit, from a resistance of 1100 ohms for the value 1, to a resistance of 1900 ohms for the value 9. Similarly, values from minus 1 to minus 9 would be represented by inserts having resistances decreasing in 100 ohm progressions per unit, from a resistance of 900 ohms for the value minus 1, to a resistance of 100 ohms for the value minus 9. By taking into consideration, in the final calculation, the number of cards being processed, a total of the value of the field being measured, including both negative and positive values, can thus be obtained.

As an example of the aforementioned modification, a particular compilation may show that there are 105 cards in the deck or series. The resistances representing the various values of the inserts in the cards might be represented as follows:

| Value: | Resistance (ohms) |
|---|---|
| −9 | 100 |
| −8 | 200 |
| −7 | 300 |
| −6 | 400 |
| −5 | 500 |
| −4 | 600 |
| −3 | 700 |
| −2 | 800 |
| −1 | 900 |
| 0 | 1000 |
| 1 | 1100 |
| 2 | 1200 |
| 3 | 1300 |
| 4 | 1400 |
| 5 | 1500 |
| 6 | 1600 |
| 7 | 1700 |
| 8 | 1800 |
| 9 | 1900 |

Of the 105 cards in the deck, the value of each card and the total resistance of the deck as taken from ohmmeter readings, is represented according to the following table:

| Number of cards in group | Value of each card in group | Total resistance in ohms of cards in group |
|---|---|---|
| 10 | −5 | 5,000 |
| 20 | 0 | 20,000 |
| 5 | 1 | 5,500 |
| 10 | 2 | 12,000 |
| 5 | 3 | 6,500 |
| 40 | 4 | 56,000 |
| 10 | 8 | 18,000 |
| 5 | 9 | 9,500 |
| Total resistance in ohms of 105 cards | | 132,500 |
| Correction for zero resistance | | 105,000 |
| | | 27,500 |

The sum of 27,500 ohms is therefore read as equivalent to the value 275, since the representation of the value 1 is 100 ohms greater than that for the representation of the value zero.

Another feature of the present invention resides in the ability to obtain a rapid count or totalization of the number of cards in a given deck or series, for various purposes, as for the use in the example given above. For this purpose, a separate field may be carried on the cards, each card having an insert of the same resistance value, the ohmmeter connected to this field acting as a counter, recording the total number of cards in the deck being compiled and separate from the totalization of the respective indicated values represented by each card of the deck, as described above.

While there has been shown and described the fundamental novel features of the invention, as applied to the modification illustrated, it will be apparent that various other modifications and deviations may be resorted to without departing from the spirit and scope of the invention. The present embodiment is, therefore, to be considered in all respects as illustrative and not restrictive, with the scope of the invention being indicated by the appended claims rather than by the foregoing description, with all changes falling within the scope, meaning and range of equivalency of the claims intended to be embraced therein.

What is claimed is:

1. A data compiling system comprising in combination: an article for recording data comprising a sheet of material which is substantially an electrical non-conductor and having electrically-resistant inserts embedded thereon; means adapted to maintain the respective inserts of a series of said sheets in contact with each other; an electric circuit with terminals; means for effecting contact between said terminals and the corresponding inserts of the series of said sheets; and means for recording the total resistance of said corresponding inserts in said series of sheets.

2. A data compiling system comprising in combination: an article for recording data comprising a card which is substantially an electrical non-conductor and having electrically-resistant inserts embedded thereon; means adapted to maintain the respective inserts of a series of said cards in contact with each other; an electric circuit with terminals; means for effecting contact between said terminals and the corresponding inserts of the series of said cards; and means for recording the total resistance of said corresponding inserts in said series of cards.

3. A data compiling system comprising in combination: an article for recording data comprising a sheet of material which is substantially an electrical non-conductor and having electrically-resistant inserts embedded thereon; a holder adapted to maintain the respective inserts of a series of said sheets in contact with each other; an electric circuit with terminals; means for effecting contact between said terminals and the corresponding inserts of the series of said sheets; and means for recording the total resistance of said corresponding inserts in said series of sheets.

4. A data compiling system comprising in combination: an article for recording data comprising a card which is substantially an electrical non-conductor and having electrically-resistant inserts embedded thereon; a holder adapted to maintain the respective inserts of a series of said cards in contact with each other; an electric circuit with terminals; means for effecting contact between said terminals and the corresponding inserts of the series of said cards; and means for recording the total resistance of said corresponding inserts in said series of cards.

5. A data compiling system comprising in combination: an article for recording data comprising a sheet of material which is substantially an electrical non-conductor and having electrically-resistant inserts embedded thereon; means adapted to maintain the respective inserts of a series of said sheets in contact with each other; an electric circuit with terminals; means for mounting said terminals and effecting contact therewith and the corresponding inserts of the series of said sheets; and means for recording the total resistance of said correponding inerts in said series of sheets.

6. A data compiling system comprising in combination: an article for recording data comprising a sheet of material which is substantially an electrical non-conductor and having electrically-resistant inserts embedded thereon; means adapted to maintain the respective inserts of a series of said sheets in contact with each other; an electric circuit with terminals; means for effecting contact between said terminals and the corresponding inserts of the series of said sheets; and electrical means for recording the total resistance of said corresponding inserts in said series of sheets.

7. A data compiling system comprising in combination. an article for recording data comprising a card which is substantially an electrical non-conductor and having electrically-resistant inserts embedded thereon; a holder adapted to maintain the respective inserts of a series of said cards in contact with each other; an electric circuit with terminals; means for maintaining and effecting contact therewith and the corresponding inserts of the series of said cards; and electrical means for recording the total resistance of said corresponding inserts in said series of cards.

References Cited by the Examiner

UNITED STATES PATENTS

| | | | |
|---|---|---|---|
| 1,982,216 | 11/34 | Lowkrantz | 235—61.111 |
| 1,997,157 | 4/35 | Tauschek | 235—61.111 |

ROBERT C. BAILEY, *Primary Examiner.*

MALCOLM A. MORRISON, *Examiner.*